United States Patent
Chadli et al.

(10) Patent No.: US 11,272,404 B2
(45) Date of Patent: Mar. 8, 2022

(54) SHARING OF RADIO RESOURCES FOR CONTENT SERVERS

(71) Applicant: ORANGE, Issy-les-Moulineaux (FR)

(72) Inventors: Youssef Chadli, Chatillon (FR); Adrien Marechal, Chatillon (FR); Frederic Fieau, Chatillon (FR); Taoufik En-Najjary, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 43 days.

(21) Appl. No.: 16/628,510

(22) PCT Filed: Jun. 22, 2018

(86) PCT No.: PCT/FR2018/051528
§ 371 (c)(1),
(2) Date: Jan. 3, 2020

(87) PCT Pub. No.: WO2019/008248
PCT Pub. Date: Jan. 10, 2019

(65) Prior Publication Data
US 2020/0187057 A1     Jun. 11, 2020

(30) Foreign Application Priority Data

Jul. 6, 2017     (FR) ..................................... 1756374

(51) Int. Cl.
*H04W 28/26*     (2009.01)
*H04L 12/14*     (2006.01)
(Continued)

(52) U.S. Cl.
CPC ......... *H04W 28/26* (2013.01); *H04L 12/1485* (2013.01); *H04W 72/044* (2013.01); *H04W 72/085* (2013.01)

(58) Field of Classification Search
CPC ............... H04W 28/26; H04W 72/044; H04W 72/1252; H04W 72/1236; H04W 72/085;
(Continued)

(56) References Cited

U.S. PATENT DOCUMENTS 8,738,017 B2     5/2014  Pischella
2006/0239249 A1*  10/2006 Banner ................... H04L 67/02
                                                              370/352

(Continued)

FOREIGN PATENT DOCUMENTS

DE     69828600 T2 *  12/2005  ........... H04L 12/287
FR     2900529 A1     11/2007
FR     3023108 A1      1/2016

OTHER PUBLICATIONS

Ahmedin et al., "Content and Buffer Aware Scheduling for Video Delivery over LTE", 2013, CoNEXT Student Workshop 2013 (Year: 2013).*

(Continued)

*Primary Examiner* — Michael K Phillips
(74) *Attorney, Agent, or Firm* — David D. Brush; Westman, Champlin & Koehler, P.A.

(57) ABSTRACT

A method for reserving physical resource blocks of a mobile access network, implemented by a content server configured to send a data stream requested by a terminal connected to the mobile access network with a determined level of quality. The method includes: determining a value of a number of blocks to be reserved, as a function of parameters related to the data stream, and the determined level of quality; sending a first request for reserving resource blocks, including the determined value of the number of blocks to be (Continued)

reserved, to a control entity of the mobile access network; and receiving a response for allocating resource blocks originating from the control entity, including a value of a number of blocks allocated to the content server.

10 Claims, 2 Drawing Sheets

(51) Int. Cl.
  *H04W 72/04* (2009.01)
  *H04W 72/08* (2009.01)

(58) Field of Classification Search
  CPC ....... H04W 16/14; H04W 28/16; H04W 4/06; H04W 4/24; H04W 72/005; H04W 72/04; H04L 47/40; H04L 65/4084; H04L 12/14; H04L 47/824; H04L 47/781; H04L 12/1485; H04L 47/805; H04N 21/2402

See application file for complete search history.

(56) References Cited

U.S. PATENT DOCUMENTS

| | | | |
|---|---|---|---|
| 2008/0109343 A1* | 5/2008 | Robinson | G06Q 10/06 705/37 |
| 2011/0149879 A1 | 6/2011 | Noriega et al. | |
| 2013/0227625 A1* | 8/2013 | Forsman | H04L 47/825 725/109 |
| 2017/0142024 A1 | 5/2017 | Fromentoux | |
| 2018/0241836 A1* | 8/2018 | Arsenault | H04L 65/4084 |
| 2018/0288114 A1* | 10/2018 | Liu | H04L 65/80 |
| 2019/0260880 A1* | 8/2019 | Albanes | H04M 15/61 |

OTHER PUBLICATIONS

English translation of the International Written Opinion dated Sep. 4, 2018 for corresponding International Application No. PCT/FR2018/051528, filed Jun. 22, 2018.
International Search Report dated Aug. 27, 2018 for corresponding International Application No. PCT/FR2018/051528, filed Jun. 22, 2018.
Written Opinion of the International Searching Authority dated Aug. 27, 2018 for corresponding International Application No. PCT/FR2018/051528, filed Jun. 22, 2018.

* cited by examiner

SHARING OF RADIO RESOURCES FOR CONTENT SERVERS

CROSS-REFERENCE TO RELATED APPLICATIONS

This Application is a Section 371 National Stage Application of International Application No. PCT/FR2018/051528, filed Jun. 22, 2018, which is incorporated by reference in its entirety and published as WO 2019/008248 A1 on Jan. 10, 2019, not in English.

1. FIELD OF THE INVENTION

The invention lies in the field of the transmission of data through mobile networks in packet mode, for example of that of the transmission of multimedia contents originating from different providers to mobile terminals connected to a 3G, 4G, or 5G access network.

2. PRIOR ART

Video traffic represents up to 70% of the total traffic on mobile networks. The use of what is called the mobile access network, including the use of frequencies and antennas for example, represents for its part more than 80% of the costs of the mobile network.

When a user wishes to consume a content on their mobile terminal, this content is on a content server, for example a cache server, which is controlled by a content provider.

Currently, the content server then sends the requested content split up into chunks that it reckons that the mobile access network will be able to deliver to the mobile terminal. The term chunk designates one of the parts of a stream, of variable or constant size; the stream is reconstituted when all the chunks are received correctly by an application running on the terminal. This is not satisfactory since the content server has no assurance that the access network will actually be able to deliver each of the chunks in an acceptable time. Indeed, it is also necessary that the chunks arrive at the terminal before their consumption is requested by the application on the terminal, for example a reader (or "player" in English) of multimedia content, for example a video; this creates otherwise a blockage of the video on the reader, a situation referred to as famine.

For this reason, it has been contemplated that the content server can reserve radio resources with a network element of the mobile operator. For example for the LTE network (so-called 4G mobile technology), in document TS36.213, the 3GPP has defined several so-called CQI (Channel Quality Indicator, in English) service classes. With each CQI are associated guarantees in terms of data transmission (lag, priority, error rate, etc.). Thus, it is possible to associate with a stream (identified by its origin address and destination address) a CQI with which a more or less guaranteed bitrate is associated. Thus, the content server can, for each of its streams, reserve a CQI service class, this amounting to reserving a bitrate which it needs in order for the content to be received by the terminal while complying with a certain quality of service.

Application of the quality parameters applies per stream. The data traffic associated with a stream will therefore have the same processing applied for all the chunks of the stream, whilst the conditions impacting quality vary over time even for non-real-time contents.

The users of one and the same mobile access network request their contents independently of one another, and it is not conceivable for content providers to agree to consult with one another when they reserve bitrates with a radio access network, for commercial reasons and on account of the complexity of implementing such consultation. This results in sub-optimal consumption of the radio resources of the mobile access network, inter alia because the content providers do not share, either amongst themselves or with mobile access network operators, the information that they hold about their users and the way in which the latter consume their contents.

One of the aims of the invention is to remedy these drawbacks of the prior art.

3. DISCLOSURE OF THE INVENTION

The invention sets out to improve the situation with the aid of a method for reserving blocks of physical resource of a mobile access network, implemented by a content server configured to emit a data stream requested by a terminal connected to the mobile access network with a determined level of quality, the method comprising:

determination of a value of a number of blocks to be reserved, as a function of parameters related to the data stream, and of the determined level of quality, emission of a first request for reservation of resource blocks, comprising the determined value of the number of blocks to be reserved, to a control entity of the mobile access network, reception of a response of allocation of resource blocks originating from the control entity, comprising a value of a number of blocks allocated to the content server.

The base unit of the radio resources used by a radiocommunications antenna to send or receive data corresponds to a frequency band available over a time interval, and is called a physical resource block, or more simply "RB". It is mainly the use of RBs which generates the costs of the mobile access network.

It is easier for an antenna controller to guarantee, for a data stream, the allocation of a number of RBs, which are the incompressible base units of the radio transmission, than the allocation of a bandwidth, or bitrate, which is liable to vary as a function of conditions which are not always under the control of the mobile access network or of the antenna.

Advantageously, by virtue of the proposed reservation method, a content server can reserve a quantity of RBs, rather than a bitrate promise, as in the earlier technique.

The content server knows the characteristics of the stream requested by the terminal, that is to say the necessary bitrate and the total volume of the data of the stream, as well as the quality of the channel used by the terminal consuming the stream, that is to say the parameter CQI. The determination of the number of blocks as a function of the bitrate and of the CQI can be for example carried out by looking up correspondence tables specific to antenna manufacturers.

According to one aspect of the reservation method, the determination of a value of a number of blocks to be reserved is done also as a function of a unit cost per block.

By virtue of this aspect, a content server knowing the price to be paid per RB is prompted to moderation in a request for reservation of RBs.

According to one aspect of the reservation method, it comprises, prior to the reception of the allocation response:

reception of a reservation response originating from the control entity, comprising a parameter relating to a unit cost of a block, emission of a second request for reservation of resource blocks, comprising a revised value of the number of blocks to be reserved, determined at least as a function of the unit cost.

By virtue of this aspect, a content server can obtain the price to be paid per RB directly from the control entity with which it made its reservation request for RBs, and revise the number of RBs that it wishes to reserve. This control entity knows the requests of the other content servers, for one and the same time interval, and can adjust the price as a function of a balance sought between the supply, that is to say the total of the RBs available, and the demand, that is to say the total number of RBs whose reservation is requested by content servers.

The invention sets out to improve the situation also with the aid of a method for allocating blocks of physical resource of a mobile access network, for a plurality of content servers configured to emit data streams to terminals connected to the mobile access network, the method comprising:

reception of first requests for reservation of blocks, originating from the plurality of content servers, a first request of a content server comprising a value of a number of blocks requested by this content server, calculation of a disparity between a number of blocks available in the mobile access network, and the total of the numbers of blocks requested, determination, at least as a function of the disparity, of values of numbers of blocks allocated to the content servers, emission of responses of allocation of blocks to the plurality of content servers, a response in respect of allocation to a content server comprising the value of the number of blocks which are allocated to this content server.

Advantageously, by virtue of the proposed allocation method, the control entity, a server of MEC type for example, receiving requests for radio resources on the part of the content servers can allocate RBs precisely, rather than, as in the earlier technique, bitrates which are liable to vary as a function of conditions which are not always under the control of the mobile access network, of the antenna, or of the control entity of the mobile access network.

According to one aspect of the allocation method, a unit cost per block is determined, and the method furthermore comprises, prior to the determination of the numbers of blocks allocated:

adjustment of the unit cost at least as a function of the disparity, emission of reservation responses to the plurality of content servers, comprising an item of information relating to the unit cost, reception of second requests for reservation of blocks, originating from the plurality of content servers, a second request of a content server comprising a revised value of the number of blocks requested by this content server, calculation of the disparity between the number of blocks available, and the total of the revised numbers of blocks requested.

When a control entity of a mobile access network receives, for its zone, that is to say for example for a cell covered by its antenna or antennas, reservation requests for a greater total number of RBs than is available for the time interval envisaged by all the requests, the network does not immediately allocate RBs by approximation to the requesting content servers, attempting to fulfill the demand as closely as possible, as is done in the earlier technique. Instead of this, the network does not allocate resources immediately and responds to the requesting entities with a modified RB unit price, and waits for a second reservation response, in an adjustment cycle.

If the requested resource is rare, that is to say if the demand exceeds the supply, the unit price of the resource is increased by the network, with respect to the current price previously known to the requesting entities. In this manner, knowing the revised unit price, the content servers can subsequently emit a second reservation request.

As a content server knows characteristics specific to its users and/or to the content that this user is requesting, it will be able to adjust its reservation request as a function of the importance that it accords to this content request. With an increased unit cost, it will have a tendency to decrease the number of RBs that it wishes to reserve, except if the importance accorded is high. The other content servers which are in competition for the same resources over the same time interval will have the same behavior, the result of which will be to moderate the total number of RBs requested, and thus to decrease the disparity between this total and the number of RBs available.

This adjustment cycle, which can be seen as a cycle of negotiation between supplier and requesting entities, can be repeated as many times as is necessary in order for this disparity to disappear, or can stop when a time limit is reached, so as not to lead to any delay in the delivery of the contents.

If the resource becomes abundant, that is to say if the supply exceeds the demand, the unit price of the resource is decreased by the network, with respect to the current price previously known to the requesting entities. In this manner, the content servers will be able to revise upwards their respective reservation requests, and this will allow the network to distribute all its resources.

The proposed method applies irrespective of the scale of the mobile access network. For simplicity, "mobile access network" is limited here to a cell by way of example, but the same principle can be applied on any scale, be it on the scale of a single 4G or 5G cell, on the scale of the set of all the cells of a national mobile operator, or on any other intermediate scale.

After one or more cycles of adjustment of the unit cost of an RB, when the disparity between supply and demand has fallen below a threshold, or when a limit of time elapsed since the very first reservation request is reached, the network allocates the RBs to the various content servers. The network can allot the RBs while seeking to fulfill the demand as closely as possible. If the disparity is not zero, the network can reduce it to zero by proportionately increasing or decreasing all the requests for resources.

The reservation method which has just been described, combined with the allocation method which has just been described, together contribute to effect convergence between supply and demand for radio resources in a system involving a mobile access network operator and content providers, without their having to share more information relating to their users and/or the contents requested, as compared with the earlier techniques where supply and demand do not converge.

The invention also relates to a device for reserving blocks of physical resource of a mobile access network, included in a content server configured to emit a data stream requested by a terminal connected to the mobile access network with a determined level of quality, the device comprising:

a determination module for determining a value of a number of blocks to be reserved, as a function of parameters related to the data stream, and of the determined level of quality, an emitter for emitting a first reservation request for reserving resource blocks, comprising the determined value of the number of blocks, to a control entity of the mobile access network, a receiver for receiving an allocation response in respect of allocation of resource blocks originating from the control entity, comprising a value of a number of blocks allocated to the content server.

According to one aspect of the reservation device, the determination module is also able to, and configured to take into account a unit cost per resource block, the receiver is also able to, and configured to receive a reservation response, comprising a parameter relating to the unit cost, and the emitter is also able to, and configured to emit a second reservation request for reserving resource blocks, comprising a revised value of a number of blocks to be reserved, determined at least as a function of the unit cost.

This device, able to implement in all its embodiments the reservation method which has just been described, is intended to be implemented in a content server, or cache server, or any other entity able to emit a multimedia data stream to a mobile terminal.

The invention relates likewise to a device for allocating blocks of physical resource of a mobile access network, for a plurality of content servers configured to emit data streams to terminals connected to the mobile access network, the device comprising:

a receiver for receiving first reservation requests in respect of blocks, originating from the plurality of content servers, a first request of a content server comprising a value of a number of blocks requested by this content server, a calculation module for calculating a disparity between a number of blocks available in the mobile access network, and the total of the numbers of blocks requested, a determination module for determining, at least as a function of the disparity, values of numbers of blocks allocated to the content servers, an emitter for emitting responses of allocation of blocks to the plurality of content servers, a response in respect of allocation to a content server comprising the value of the number of blocks which are allocated to this content server.

According to one aspect of the allocation device, it furthermore comprises an adjustment module for adjusting the unit cost as a function of the calculated disparity, the emitter furthermore being able to emit reservation responses to the plurality of content servers, comprising an item of information relating to the unit cost, and the receiver being able to receive second reservation requests in respect of blocks, originating from the plurality of content servers, a second request of a content server comprising a revised number of blocks requested by this content server.

This allocation device, able to implement in all its embodiments the allocation method which has just been described, is intended to be implemented in an entity or control server in contact with the mobile access network, able to manage the traffic to mobile terminals, and able also to access information in real time about the operation of the radio part of a base station of the mobile access network.

The invention further relates to a system for sharing blocks of physical resource of a mobile access network, comprising at least two reservation devices complying with what has just been described, and an allocation device complying with what has just been described, the allocation device being connected to the reservation devices and to a base station.

The invention also relates to a computer program, comprising instructions for the implementation of the steps of the method for reserving blocks of physical resource of a mobile access network which has just been described, when this program is executed by a processor.

The invention also envisages an information medium readable by a content server, and comprising instructions of a computer program such as is mentioned hereinabove.

The invention also relates to a computer program, comprising instructions for the implementation of the steps of the method for allocating blocks of physical resource of a mobile access network which has just been described, when this program is executed by a processor.

The invention also envisages an information medium readable by a control server connected to a base station, and comprising instructions of a computer program such as is mentioned hereinabove.

These programs can use any programming language, and be in the form of source code, object code, or of code intermediate between source code and object code, such as in a partially compiled form, or in any other desirable form.

The information mediums can be any entity or device capable of storing the program. For example, a medium can comprise a storage means, such as a ROM, for example a CD ROM or a microelectronic circuit ROM, or else a magnetic recording means, for example a diskette (floppy disk) or a hard disk.

Moreover, an information medium can be a transmissible medium such as an electrical or optical signal, which can be conveyed via an electrical or optical cable, by radio or by other means. The programs according to the invention can be in particular downloaded over a network of Internet type.

Alternatively, an information medium can be an integrated circuit in which a program is incorporated, the circuit being adapted to execute or to be used in the execution of the methods in question.

4. PRESENTATION OF THE FIGURES

Other advantages and characteristics of the invention will become more clearly apparent on reading the following description of a particular embodiment of the invention, given by way of simple illustrative and nonlimiting example, and of the appended drawings, among which:

5. DETAILED DESCRIPTION OF AT LEAST ONE EMBODIMENT OF THE INVENTION

In the subsequent description, examples are presented of several embodiments of the invention based on so-called MEC (for "Mobile Edge Computing" in English) technology, undergoing standardization with the ETSI (for "European Telecommunications Standards Institute" in English), but the invention also applies to other mobile access network architectures.

Figure 1:
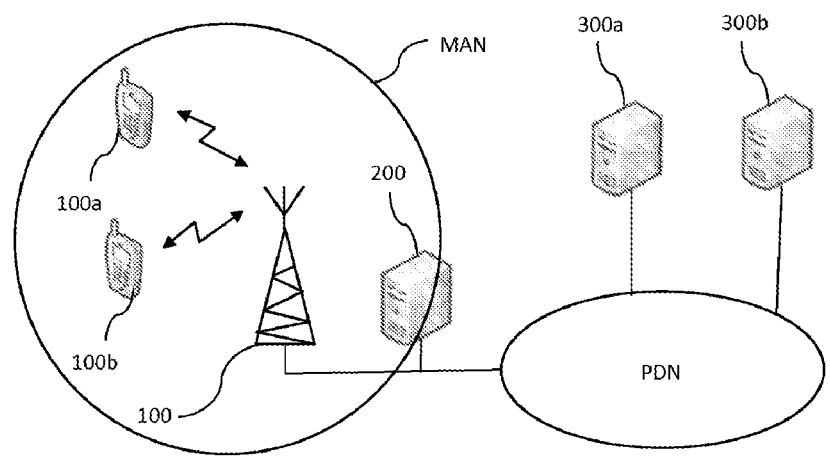
FIG. 1 illustrates a configuration of a mobile access network of the cellular type and the interactions between entities of such a network while two user terminals are accessing multimedia contents on two content servers, according to one embodiment of the invention.

FIG. 1 illustrates a configuration of a mobile access network of the cellular type and the interactions between entities of such a network while two user terminals are accessing multimedia contents on two content servers, according to one embodiment of the invention.

The cellular network edge (or boundary or periphery) computing technology, MEC technology offers the possibility of exploiting a cellular network edge location to optimize applications dedicated to the users of such a cellular network. It is thus apparent that MEC technology could be adapted to the diverse problematic issues in the broadcasting of multimedia contents in a cellular network and in a multiuser environment.

The control server 200 is such a server of MEC type and is located between the PDN network and the base station 100 which manages the radio part of the MAN (or mobile access network, by generalization) cellular network. Its situation allows the control server 200 to manage the traffic from, and to, the mobile terminals 100a and 100b of users, as well as to access information in real time about the operation of the radio part of the network. A device for allocating blocks of physical resource of a mobile access network implementing the technique described is included in the control server 200. The base station 100 is for example an eNodeB of the 4G mobile technology. The PDN network is for example the core network of the operator of the cellular network, or the Internet network, or encompasses both at one and the same time.

The multimedia contents requested respectively by the terminals 100a and 100b are hosted by the content servers 300a and 300b. The servers 300a and 300b are for example so-called cache servers, onto which the content requests are redirected by other servers further upstream and invoked directly by the requesting mobile terminals. A cache or content server emits a requested multimedia content to a requesting terminal in the form of a data stream, split up into successive chunks whose size is variable and determined according to several criteria, such as the size of the buffer memory of the terminal, and also the radio characteristics of the mobile access network MAN.

The way in which the size of the chunks is indirectly determined forms the subject of the hereinafter-proposed procedures for reserving and allocating blocks. For simplicity, the exemplary embodiments are presented on the basis of 2 mobile terminals 100a and 100b, and of 2 servers 300a and 300b, but the proposed procedures apply to any number of distinct content servers serving at least as many distinct terminals, a content server being able to serve more than one terminal.

For simplicity also, the sense given to "terminal" is the same as "client software of the terminal". In this document, several items of client software running on the same physical terminal are to be considered as so many terminals, if they receive streams on the part of different content servers.

Figure 2:
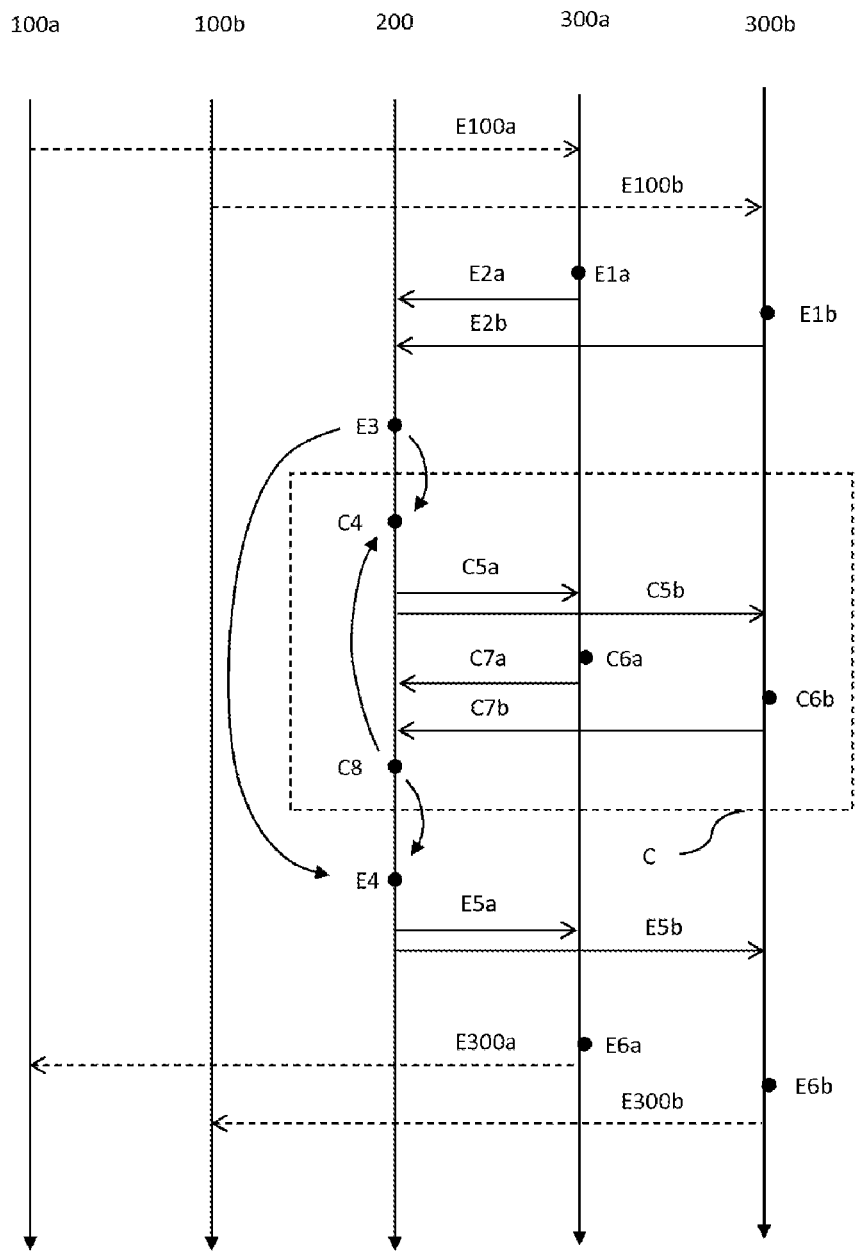
FIG. 2 illustrates the steps of a procedure for reserving and of a procedure for allocating blocks of physical resource of a mobile access network, according to several embodiments of the invention.

FIG. 2 illustrates the steps of a procedure for reserving and of a procedure for allocating blocks of physical resource of a mobile access network, according to several embodiments of the invention.

During a known step E100a, a request for a multimedia content emanating from the terminal 100a is received by the content server 300a, in a direct or indirect manner via a network head server, or via a content referencing server, for example. In addition to an identifier of the requested content which allows the content server to know some characteristics thereof such as its total volume, its encoding type or types, its category (advertisement, music clip, etc.), this request can also comprise one or more parameters characteristic of the terminal 100a and of its connection to the mobile access network, such as for example a CQI (Channel Quality Indicator, in English), a buffer memory fill state. The content server 300a can also deduce the buffer memory's fill state on the basis of a counting of the already emitted stream chunks.

Similarly, during a known step E100b, a request for a multimedia content emanating from the terminal 100b is received by the content server 300b.

It is assumed that the content servers 300a and 300b are managed by mutually independent contents providers, sharing no information about their users or the contents that they request.

During a step E1a, the content server 300a determines a number N0a of blocks, called RBs, to be reserved with the control server 200, as a function of parameters related to the requested content, that is to say related to the data stream required to be implemented to deliver this content, and as a function of parameters related to the terminal, that is to say related to a level of quality compatible with the conditions of the terminal 100a and of its radio link with the mobile access network MAN.

Knowing the radio technology used, for example LTE, the CQI of the terminal, the channel bandwidth used (LTE channel bandwidth) and the correspondence between the CQI and the number of bits per millisecond, as well as the type of MIMO used, the server can deduce the instantaneous consumption of the terminal in RBs per kilo byte.

The CQI changes over time as a function of several parameters: distance of the terminal with respect to the station, interference, presence of obstacles to propagation (rain, tree, etc.), the parameter having the greatest impact being the distance between the terminal and the base station 100. This information can be uploaded regularly by the terminal, thereby assuming a confidence on the part of the content provider, or be provided by the server 200.

The radio technology used is an item of information provided by the terminal.

The bandwidth of the channel corresponds to the size of the frequency band used by the station, granted to the operator of the mobile access network. It makes it possible to know the division into number of RBs. This is a static item of information provided to the content servers 300a and 300b during an initialization phase.

The correspondence between the CQI and the "TBS" (Transport Block Size, that is to say the number of bits emitted per ms) depends on the equipment that the base station 100 uses. This item of information which is not static is known to the control server 200 and can be transmitted to the content servers 300a and 300b dynamically over time. The TBS also depends on the bandwidth of the channel. To a CQI and a bandwidth there corresponds a TBS.

The MIMO used, 2×2 or 4×4 for example, depends on the equipment that the base station uses. This item of information can be provided by the control server 200 to the content servers 300a and 300b on initialization.

For example, assuming:
a bandwidth of the channel of 20 MHZ, divided into 100 RBs (per time interval)
a CQI=15 corresponding to a TBS=75376 bits per ms.
a 2×2 MIMO, 100 RBs allow the sending of 75376×2 (2×2 MIMO used) bits, that is to say 150752 bits. The capacity of 1 RB is therefore 1507 bits.

Therefore, if during step E1a, the content server 300a has determined that it wishes to transmit a stream chunk whose volume is 0.9 Mbytes to the terminal 100a, the number N0a of RBs that it must reserve under these conditions is 600.

Similarly, during a step E1b, the content server 300b determines also a number of blocks RB to be reserved with the control server 200, whose value is N0b.

During a step E2a, the content server 300a emits a first reservation request for a number of blocks equal to N0a, destined for the control server 200. This request can be transported in a message using any protocol, for example an http request with an XML body comprising a parameter <requested RB>.

During a step E2b, the content server 300b emits a first reservation request for a number of blocks equal to N0b, also destined for the control server 200. It is understood that these first two reservation requests are made by the content servers 300a and 300b without consulting one another, and without knowing the total number of blocks at the disposal of the control server 200 in order to satisfy their respective reservation requests.

The control server 200 knows, for any time interval, the number of blocks RB available, Ndis, for the emission of data by radio electrical pathway from the base station 100 to all the mobile terminals that are attached to the base station and have made resource reservations, that is to say, in our simplified example, the number of blocks available for the emission of data from the base station 100 to the 2 terminals 100a and 100b.

During a step E3, the control server 200 calculates a disparity between Ndis, the number of blocks available, and the sum of the blocks requested under reservation, that is to say N0a+N0b.

If this disparity is small, for example less than or equal to a determined threshold S, the control server 200 decides, during a step E4, to allocate each of the content servers 300a and 300b a number close to or equal to the numbers of blocks RB that they requested (N0a and N0b respectively). If the disparity is large but the supply is greater than the demand, the control server 200 does likewise.

If the disparity is large, for example greater than the threshold S, and if the supply is less than the demand, the control server 200 then decides to enter a cycle C of negotiation with the requesting terminals 100a and 100b, the aim of which is to reduce the disparity between the supply (the number of blocks available, Ndis) and the demand (the number of blocks requested, N0a+N0b).

At least one cycle C of negotiation may be necessary in order to make supply and demand converge, and a single one will be described. The steps of the negotiation cycle C are indicated by a letter C followed by other characters.

During a step C4, as the demand is greater than the supply, the control server 200 decides to modify the cost of use of the blocks RB by the terminals. Initially, this cost may be nonexistent, or of a value known to the terminals. For simplicity, it is considered that, outside of the cycle C, the unit cost of the RB is standard and constant or does not change frequently enough to have an impact on the reservation requests made by the content servers during the previous steps E2a and E2b.

During a step C5a, the control server 200 therefore emits a reservation response to the content server 300a, not to indicate to it that its request is satisfied, or to indicate to it the number of RBs which is allocated to it, but to provide it with an item of information relating to a modification of the unit cost of the RB. This item of information may be the new value of the unit cost of the RB, or the value of an extra cost with respect to the standard unit cost of the RB. This response can be transported in a message using any protocol, for example an http request with an XML body comprising a parameter <price RB>.

Similarly, during a step C5b, the control server 200 emits a reservation response also to the content server 300b, comprising the same item of information relating to the modification of the unit cost of the RB.

During a step C6a, the content server 300a determines a new number of blocks RB to be reserved, NC1a, with the control server 200, as a function of the parameters related to the content requested and as a function of parameters related to the terminal, as during step E1a, except that in this step C6a, the content server 300a determines this new number of blocks to be reserved also as a function of the value, received during step C5a, of the modified unit cost of the RB. Even if a cost per RB increased by the control server 200 is done with the objective of prompting the content server 300a to decrease the number of RBs for which it requests reservation, it may decide to maintain the same number, for example because it has obtained an indication that the buffer memory of the terminal 100a is empty or almost empty. Hence, if for example the content server 300a serves distinct streams to several terminals in the same mobile access network (the same cell), and not only to the terminal 100a, it may decide to decrease the number of RBs for which it requests reservation for some of the terminals, and to maintain it for certain favored terminals, while decreasing the total number for the whole set of terminals that it serves.

Similarly, during a step C6b, the content server 300b determines a new number of blocks RB, NC1b, to be reserved with the control server 200.

During a step C7a, the content server 300a emits a second reservation request for a number of blocks equal to NC1a, destined for the control server 200.

Similarly, during a step C7b, the content server 300a emits a second reservation request for a number of blocks equal to NC1b, destined for the control server 200. This second request can be transported in a message using any protocol, for example an http request with an XML body comprising a parameter <revised RB>.

During a step C8, the control server 200, having received the second reservation requests of the content servers 300a and 300b, calculates a disparity between Ndis, the number of blocks available, and the sum of the blocks requested under reservation, that is to say NC1a+NC1b.

If this disparity is small, for example less than or equal to the determined threshold S, the control server 200 decides to exit the negotiation cycle C and to implement step E4 already described, that is to say to allocate each of the content servers 300a and 300b a number close to or equal to the numbers of blocks RB that they have requested (NC1a and NC1b respectively).

During step E4, particularly when it is performed after at least one iteration of the cycle C, it is advantageous that the control server 200 stores the number of blocks allocated to each of the content servers as well as the unit cost per block RB used, for the purposes of later billing to the operators managing the content servers.

If on the other hand the disparity calculated during step C8 is large, for example greater than the threshold S, the control server 200 then decides to remain in the negotiation cycle C, implementing once again all the steps of the cycle C, from step C4 up to step C8.

If the disparity remains large after several iterations of the negotiation cycle C, another condition for exiting the cycle may be a maximum time elapsed since the first iteration, or a maximum number of iterations, stated otherwise the reaching of a limit to the number of second reservation requests that can be emitted by the content servers.

Subsequent to step E4 of determining numbers of blocks RB allocated, the control server 200 informs the content servers thereof.

During a step E5a, the control server 200 emits an allocation response to the server 300a comprising an item of information relating to the number of blocks RB which are allocated for the transmission of the data of the server 300a by the base station 100 to the terminal 100a. This response can be transported in a message using any protocol, for example an http request with an XML body comprising a parameter <allocated RB>.

Similarly, during a step E5b, the control server 200 emits an allocation response to the server 300b comprising an item of information relating to the number of blocks RB which are allocated for the transmission of the data of the server 300b by the base station 100 to the terminal 100b.

During a step E6a, the content server 300a determines as a function of the number of RBs allocated the volume of data forming part of a stream, or stream chunks, that it will have to transfer to the base station 100 so that the latter emits it to the terminal 100a. This determination is the operation inverse to step E1a, where the server 300a determined a number of RBs as a function of parameters related to the data stream.

Similarly, during a step E6b, the content server 300b determines as a function of the number of RBs allocated the size of a stream chunk.

During a known step E300a, in response to the request, emitted during step E100a, for a multimedia content emanating from the terminal 100a, the content server 300a emits its stream chunk to the terminal 100a through the base station 100.

Similarly, during a known step E300b, in response to the request, emitted during step E100b, for a multimedia content emanating from the terminal 100b, the content server 300b emits its stream chunk to the terminal 100b through the base station 100.

Figure 3:
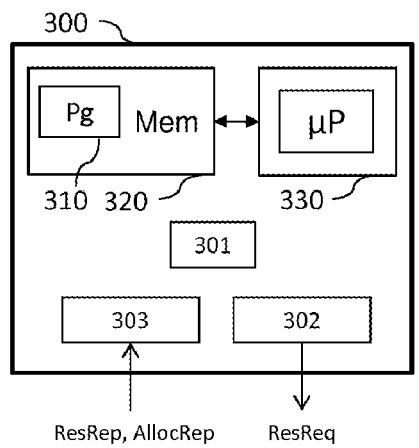
FIG. 3 illustrates an exemplary structure of a device for reserving blocks of physical resource of a mobile access network, according to various embodiments of the invention.

In conjunction with FIG. 3, an exemplary structure of a device for reserving blocks of physical resource of a mobile access network, according to one aspect of the invention, is now presented.

The device 300 for reserving blocks of physical resource of a mobile access network implements the method for reserving blocks of physical resource of a mobile access network, various embodiments of which have just been described.

Such a device 300 can be implemented in a content server, a cache server, or any other server able to emit streams of multimedia data to mobile terminals.

For example, the device 300 comprises a processing unit 330, equipped for example with a microprocessor µP, and driven by a computer program 310, stored in a memory 320 and implementing the reservation method according to the invention. On initialization, the code instructions of the computer program 310 are for example loaded into a RAM memory, before being executed by the processor of the processing unit 330.

The device 300 also comprises:
- a determination module 301, able to, and configured to determine a number of resource blocks to be reserved, as a function of parameters related to a data stream between the device 300 and a mobile terminal, and of a level of quality of a connection of a terminal to a mobile access network,
- an emitter 302 able to, and configured to emit a first request for reservation of resource blocks (ResReq), comprising a value, determined by the device 300, of a number of blocks, to a control entity of the mobile access network,
- a receiver 303 able to, and configured to receive a response of allocation of resource blocks originating from the control entity (AllocRep), comprising a value of a number of blocks allocated to the stream.

Advantageously, the module 301 is also able to, and configured to take into account a unit cost per resource block.

Advantageously, the receiver 303 is also able to, and configured to receive a reservation response (ResRep), comprising a parameter relating to a unit cost of a resource block.

Advantageously, the emitter 302 is also able to, and configured to emit a second request for reservation of resource blocks (ResReq), comprising a revised value of a number of blocks to be reserved, determined at least as a function of the unit cost of a resource block.

Figure 4:
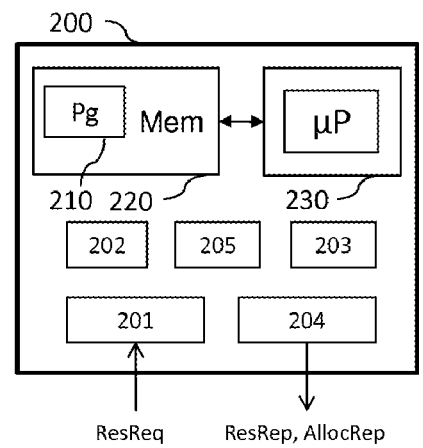
FIG. 4 illustrates an exemplary structure of a device for allocating blocks of physical resource of a mobile access network, according to various embodiments of the invention.

In conjunction with FIG. 4, an exemplary structure of a device for allocating blocks of physical resource of a mobile access network, according to one aspect of the invention, is now presented.

The device 200 for allocating blocks of physical resource of a mobile access network implements the method for allocating blocks of physical resource of a mobile access network, various embodiments of which have just been described.

Such a device 200 can be implemented in a control server, connected to a base station and able to manage the traffic from, and to, mobile terminals, as well as to access information in real time about the operation of the radio part of the base station. This control server is for example of MEC (Mobile Edge Computing) type.

For example, the device 200 comprises a processing unit 230, equipped for example with a microprocessor µP, and driven by a computer program 210, stored in a memory 220 and implementing the reservation method according to the invention. On initialization, the code instructions of the computer program 210 are for example loaded into a RAM memory, before being executed by the processor of the processing unit 230.

The device 200 also comprises:
- a receiver 201 able to, and configured to receive requests for reservation of resource blocks (ResReq), comprising a value of a number of blocks, requested by content servers,
- a calculation module 202, able to, and configured to calculate a disparity between a number of blocks available in the mobile access network, and the total of the numbers of blocks requested,
- a determination module 203, able to, and configured to determine at least as a function of the calculated disparity, values of numbers of blocks allocated to the content servers, an emitter 204 able to, and configured to emit responses of allocation of resource blocks (AllocRep), comprising values of numbers of blocks which are allocated to the content servers.

Advantageously, the device 200 also comprises an adjustment module 205, able to, and configured for adjustment of the unit cost at least as a function of the disparity.

Advantageously, the emitter 204 is also able to, and configured to emit reservation responses to the content servers (ResRep), comprising an item of information relating to the unit cost.

The modules described in conjunction with FIGS. 3 and 4 may be hardware modules or software modules.

These FIGS. 3 and 4 illustrate only a particular way, from among several possible ways, to carry out the methods detailed hereinabove, in conjunction with FIGS. 1 and 2. Indeed, the technique of the invention is carried out interchangeably on a reprogrammable calculation machine (a computer PC, a processor DSP or a microcontroller) executing a program comprising a sequence of instructions, or on a dedicated calculation machine (for example a set of logic gates such as an FPGA or an ASIC, or any other hardware module).

In the case where the invention is installed on a reprogrammable calculation machine, the corresponding program (that is to say the sequence of instructions) will be able to be stored in a removable storage facility (such as for example a diskette, a CD-ROM or a DVD-ROM) or otherwise, this storage facility being partially or totally readable by a computer or a processor.

The exemplary embodiments of the invention which have just been presented are only a few of the conceivable embodiments. They show that the invention makes it possible to obtain optimal consumption of the radio resources of the mobile access network, without the content providers sharing, either amongst themselves or with the operators of mobile access networks, the information that they hold about their users and the way in which the latter consume their contents.

The invention claimed is:

1. A reservation method for reserving blocks of physical resource of a mobile access network, implemented by a content server configured to emit a data stream requested by a terminal connected to the mobile access network with a determined level of quality, the method comprising acts including:
   determining a value of a number of blocks to be reserved, based on parameters related to the data stream, and of the determined level of quality, and based on a unit cost per block,
   emitting a first request for reservation of blocks, comprising the determined value of the number of blocks to be reserved, to a control entity of the mobile access network, and
   receiving a response of allocation of blocks originating from the control entity, comprising a value of a number of blocks allocated to the content server.

2. The reservation method as claimed in claim 1, comprising, prior to the act of receiving the response of allocation:
   receiving a reservation response originating from the control entity, comprising an item of information relating to an adjusted unit cost of a block,
   emitting a second request for reservation of blocks, comprising a revised value of the number of blocks to be reserved, determined at least based on the adjusted unit cost.

3. An allocation method for allocating blocks of physical resource of a mobile access network, for a plurality of content servers configured to emit data streams to terminals connected to the mobile access network, the method comprising the following acts performed by a control entity of the mobile access network:
   receiving first requests for reservation of blocks, originating from the plurality of content servers, a first request of a content server comprising a value of a number of blocks requested by this content server,
   calculating a disparity between a number of blocks available in the mobile access network, and a total of the numbers of blocks requested by the plurality of content servers,
   determining, at least based on the disparity, values of numbers of blocks allocated to the content servers, and
   emitting responses of allocation of blocks to the plurality of content servers, a response in respect of allocation to a content server comprising the value of the number of blocks which are allocated to this content server.

4. The allocation method as claimed in claim 3, where a unit cost per block is determined, and where the method furthermore comprises, prior to the act of determining the values of numbers of blocks allocated:
   adjusting the unit cost at least based on the disparity,
   emitting reservation responses to the plurality of content servers, comprising an item of information relating to the adjusted unit cost,
   receiving second requests for reservation of blocks, originating from the plurality of content servers, a second request of a content server comprising a revised value of the number of blocks requested by this content server, and
   calculating the disparity between the number of blocks available, and a total of the revised numbers of blocks requested.

5. A device for reserving blocks of physical resource of a mobile access network, included in a content server configured to emit a data stream requested by a terminal connected to the mobile access network with a determined level of quality, the device comprising:
   a processor; and
   a non-transitory computer-readable medium comprising instructions stored thereon which when executed by the processor configure the device to:
   determine a value of a number of blocks to be reserved, based on parameters related to the data stream, and of the determined level of quality, and based on a unit cost per block,
   emit a first reservation request for reserving blocks, comprising the determined value of the number of blocks, to a control entity of the mobile access network, and
   receive an allocation response in respect of allocation of blocks originating from the control entity, comprising a value of a number of blocks allocated to the content server.

6. The device as claimed in claim 5, where the device is further configured to receive a reservation response comprising an item of information relating to an adjusted unit cost of a block; and emit a second reservation request for reserving blocks, comprising a revised value of the number of blocks to be reserved, determined at least based on the adjusted unit cost.

7. A device for allocating blocks of physical resource of a mobile access network, for a plurality of content servers configured to emit data streams to terminals connected to the mobile access network, the device comprising:
- a processor; and
- a non-transitory computer-readable medium comprising instructions stored thereon which when executed by the processor configure the device to:
- receive first reservation requests in respect of blocks, originating from the plurality of content servers, a first request of a content server comprising a value of a number of blocks requested by this content server,
- calculate a disparity between a number of blocks available in the mobile access network, and a total of the numbers of blocks requested by the plurality of content servers, determine-, at least based on the disparity, values of numbers of blocks allocated to the content servers, and
- emit responses of allocation of blocks to the plurality of content servers, a response in respect of allocation to a content server comprising the value of the number of blocks which are allocated to this content server.

8. The device as claimed in claim 7, wherein the device is furthermore configured to adjust a unit cost per block on the calculated disparity; emit reservation responses to the plurality of content servers comprising an item of information relating to the adjusted unit cost; and receive second reservation requests in respect of blocks, originating from the plurality of content servers, a second request of a content server comprising a revised number of blocks requested by this content server.

9. A non-transitory information medium readable by a content server, and comprising instructions of a computer program stored thereon, which when executed by a processor of the content server configure the content server to reserve blocks of physical resource of a mobile access network, the content server being configured to emit a data stream requested by a terminal connected to the mobile access network with a determined level of quality, wherein the instructions configure the content server to:
- determine a value of a number of blocks to be reserved, based on parameters related to the data stream, and of the determined level of quality, and based on a unit cost per block,
- emit a first request for reservation of blocks, comprising the determined value of the number of blocks to be reserved, to a control entity of the mobile access network, and
- receive a response of allocation of blocks originating from the control entity, comprising a value of a number of blocks allocated to the content server.

10. A non-transitory information medium readable by a control server connected to a base station, and comprising instructions of a computer program stored thereon which when executed by a processor of the control server configure the control server to allocate blocks of physical resource of a mobile access network, for a plurality of content servers configured to emit data streams to terminals connected to the mobile access network, wherein the instructions configure the control server to:
- receive first requests for reservation of blocks, originating from the plurality of content servers, a first request of a content server comprising a value of a number of blocks requested by this content server,
- calculate a disparity between a number of blocks available in the mobile access network, and a total of the numbers of blocks requested by the plurality of content servers,
- determine, at least based on the disparity, values of numbers of blocks allocated to the content servers, and
- emit responses of allocation of blocks to the plurality of content servers, a response in respect of allocation to a content server comprising the value of the number of blocks which are allocated to this content server.

* * * * *